July 24, 1934.  V. BENDIX ET AL  1,967,390
BRAKE
Filed June 3, 1929  2 Sheets-Sheet 1
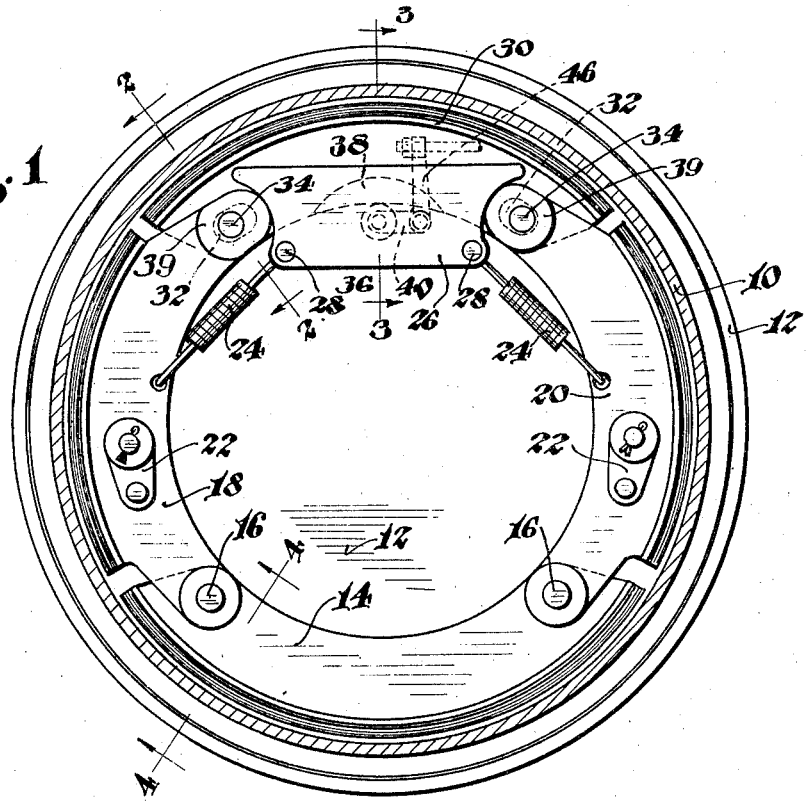
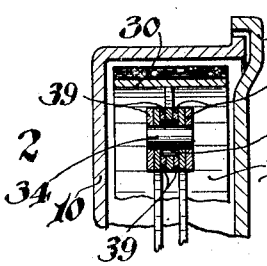
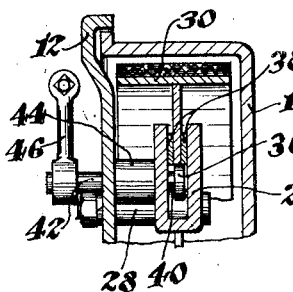
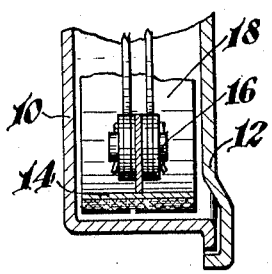
INVENTORS
Vincent Bendix
Ludger E. La Brie
BY
Jn. W. McConkey
ATTORNEY July 24, 1934.   V. BENDIX ET AL   1,967,390
BRAKE
Filed June 3, 1929   2 Sheets-Sheet 2
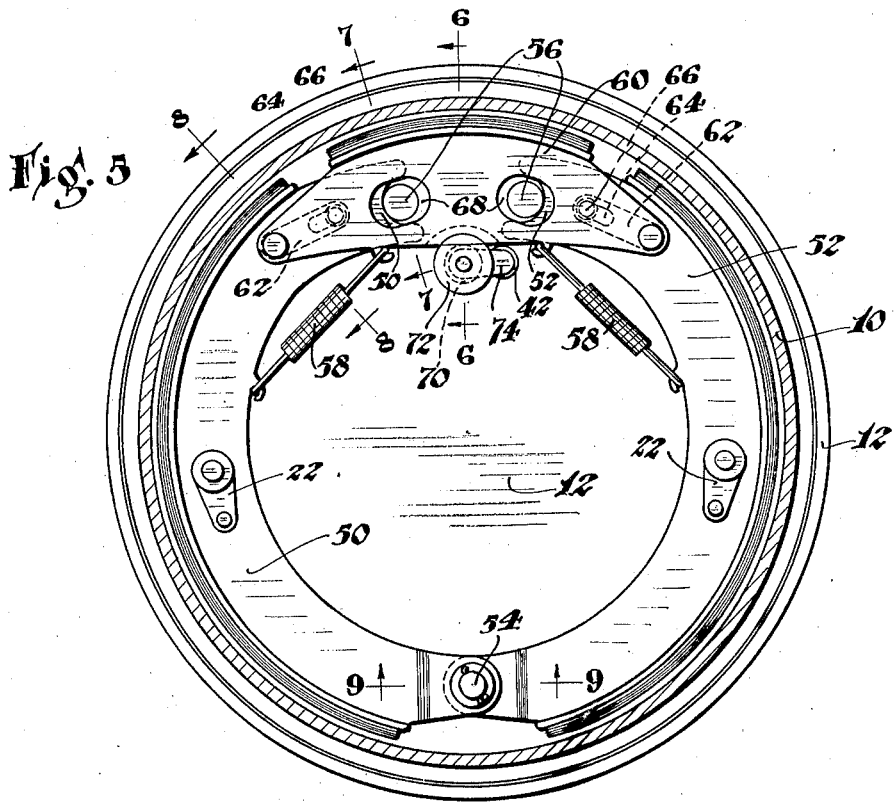
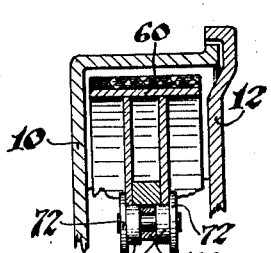
Fig. 6
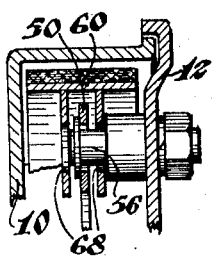
Fig. 7
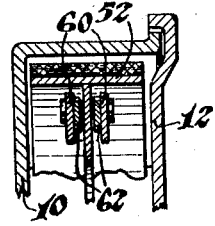
Fig. 8
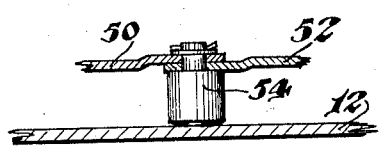
Fig. 9
INVENTORS
Vincent Bendix
Ludger E. LaBrie
BY
ATTORNEY Patented July 24, 1934

1,967,390

UNITED STATES PATENT OFFICE 1,967,390

BRAKE

Vincent Bendix, Chicago, Ill., and Ludger E. La Brie, South Bend, Ind., assignors to Bendix Brake Company, South Bend, Ind., a corporation of Illinois Application June 3, 1929, Serial No. 367,899

16 Claims. (Cl. 188—78)

This invention relates to brakes, and is illustrated as embodied in two forms of internal expanding automobile brakes. An object of the invention is to provide a simple yet very powerful brake, by utilizing the "servo" principle having one shoe or the like operated by the rotating drum to apply the remainder of the brake. Various features of novelty relate to the operating means for the servo shoe, to the connections between the servo shoe and the main friction means of the brake, to the arrangement of connected floating shoes constituting the main friction means of the brake, and to other desirable constructions and arrangements which will be apparent from the following description of the two illustrative embodiments shown in the accompanying drawings, in which:

Figure 1 is a vertical section through the first embodiment, just inside the head of the brake drum, showing the brake shoes in side elevation;

Figure 2 is a partial section through one of the connections between the servo shoe and one of the other shoes, on the line 2—2 of Figure 1;

Figure 3 is a partial section through the applying means, on the line 3—3 of Figure 1;

Figure 4 is a partial section on the line 4—4 of Figure 1, showing the floating pivot connecting two of the shoes of the main friction means of the brake;

Figure 5 is a vertical section through a second embodiment, just inside the head of the drum, showing the brake shoes in side elevation;

Figure 6 is a section showing the applying means, on the line 6—6 of Figure 5;

Figure 7 is a section through one of the brake anchors, on the line 7—7 of Figure 5;

Figure 8 is a partial section on the line 8—8 of Figure 5, showing the linkage connecting the servo shoe to the main friction means of the brake; and Figure 9 is a partial section on the line 9—9 of Figure 5, showing the floating pivot connection between the shoes of the main friction means of the brake.

The invention is illustrated in Figures 1-4 as embodied in a brake having the usual rotatable drum 10, at the open side of which is a support such as a backing plate 12, and within which is arranged the friction means of the brake. The main friction means of this particular brake includes a central shoe 14 having its opposite ends connected by floating pivots 16 to end shoes 18 and 20, each of which has spaced parallel webs embracing the corresponding end of the web of shoe 14. Shoes 18 and 20 have positioning devices 22, of any desired character, to determine their released positions. The particular devices 22 illustrated are more fully described and are claimed in prior application No. 145,189, filed Oct. 30, 1926.

The upper, or unpivoted, ends of shoes 18 and 20 are normally held by inclined return springs 24 against the ends of a channel-shaped anchor or guide member 26 fixedly mounted on the backing plate by posts 28, the opposite ends of member 26 thus serving as the anchors of the brake. In the operation of the brake as thus far described, if the drum is turning clockwise when the brake is applied the shoe 18 anchors against the left end of member 26, and if the drum is turning counter-clockwise the shoe 20 anchors against the right end of member 26. The ends of member 26 are recessed to form sockets for pivotal engagement with the rounded ends of shoes 18 and 20.

Within the channel of member 26 is nested the web of a servo shoe 30 having its ends projecting between the ends of the parallel webs of shoes 18 and 20, and having the ends of its web formed with relatively large openings or slots 32 for lost-motion engagement with transverse pins or pivots 34 carried by the ends of the webs of shoes 18 and 20. The slots 32 may be reinforced by washers 39 welded to the shoe webs.

The servo shoe 30 is moved radially against the drum, to apply the brake, by means such as a cam roller 36 engaging the inner edge of its web (the web being reinforced if desired by welding plates 38 to its sides), the roller being carried by a crank arm 40 projecting eccentrically from a shaft 42 journaled in a bearing bracket 44 carried by the backing plate, the shaft being provided with an operating arm 46. When in engagement with the drum, shoe 30 is frictionally urged by the drum in one direction or the other to apply the main friction means of the brake, as described above.

In the embodiment of Figures 5-9, the main friction means of the brake comprises a pair of floating shoes 50 and 52 connected by a floating pivot 54 having a rounded head slidably engaging the backing plate. The shoes 50 and 52 are notched at their upper ends to embrace fixed posts or anchors 56 carried by the backing plate, shoe 50 anchoring against its post 56 when the drum is turning clockwise, and shoe 52 anchoring against its post 56 when the drum is turning counter-clockwise. Return springs 58 urge the shoes against the anchors 56.

The upper, or anchored, ends of shoes 50 and 52 are straddled by the spaced parallel webs of a channel-section servo shoe 60 having within its channel at its opposite ends pairs of tension links 62 pivoted to the opposite ends of the webs, and having lost-motion slots 64 embracing transverse pivot pins 66 carried by the webs of shoes 50 and 52 adjacent their anchored ends. Thus the shoe 60, when in engagement with the drum, tends to turn in one direction or the other with the drum to operate through the linkage 64 to act on the unanchored one of the shoes 50 and 52 to apply both of these shoes.

It will be noted that the return springs 58 are connected at their upper ends to the shoe 60, so that they serve as return springs for this shoe as well as for shoes 50 and 52. The webs of shoe 60, as a matter of convenience of manufacture and also so that the shoe may be reversible end for end, are preferably both formed with openings 68 necessary for the passage of anchors 56.

The shoe 60 is forced radially outward, to apply the brake, by means such as rollers 70 engaging the inner edges of the webs of shoe 60 and which, with parts such as washers 72 embracing the shoe webs between them, are mounted on an eccentric or crank arm 74 on the above-described shaft 42.

While two illustrative embodiments have been described in detail, it is not our intention to limit the scope of the invention to those particular embodiments, or otherwise than by the terms of the appended claims. It is not our intention to claim in the present application any of the subject-matter of prior applications Nos. 235,428, 237,373, 240,243, 279,894, 302,033, 306,185, and 334,673, all owned by the assignee of the present application, Bendix Brake Company.

We claim:

1. A brake comprising, in combination, a drum, a friction device having one part which anchors when the drum is turning in one direction and another part which anchors when the drum is turning in the other direction, a servo shoe having at its opposite ends operative overrunning connections to the adjacent ends of the friction device and shiftable with the drum in either direction to act on one end or the other of the ends of the friction device to apply said device, and an applying device acting radially outward by direct thrust engagement with the inner edge of the web of said shoe.

2. A brake comprising, in combination, a drum, a friction device having one end which anchors when the drum is turning in one direction and another end which anchors when the drum is turning in the other direction, a servo shoe, overrunning connections between the servo shoe and the anchoring ends of the friction device, said servo shoe shiftable with the drum in either direction to act on one end or the other of the friction device to apply said device, and an operating shaft having an eccentric device in direct thrust engagement with the inner edge of the web of said shoe.

3. A brake comprising, in combination, a friction device shiftable to anchor on one or the other of two parts, a servo shoe linked to both ends of said device and acting on one or the other of said ends to apply said device, and applying means for the servo shoe independent of the connections from the servo shoe to said device.

4. A brake comprising, in combination, a friction device and a servo shoe having its ends positively linked to both ends of said device with lost-motion connections and acting on one or the other of said ends to apply said device.

5. A brake comprising, in combination, a friction device and a servo shoe having at its opposite ends lost-motion links connecting it to said device.

6. A brake comprising, in combination, a shiftable-anchorage friction device having adjacent separable ends, and a servo shoe overlapping said ends and linked thereto.

7. A brake comprising, in combination, a shiftable-anchorage friction device having adjacent separable ends, and a servo shoe overlapping said ends and connected thereto by oppositely-extending lost-motion links.

8. A servo shoe having lost-motion links connected to its opposite ends and anchorage means adjacent said links.

9. A channel-shaped servo shoe having within its channel lost-motion links connected to its opposite ends and extending toward the center of the shoe.

10. A brake comprising, in combination, a pair of anchor devices, friction means engageable with said devices, and a servo shoe adjacent the anchor devices and linked to the friction means.

11. A brake comprising, in combination, a drum, anchorage means, friction means engageable therewith and anchoring on said means at one point when the drum is turning in one direction and at a different point when the drum is turning in the other direction, and a servo shoe adjacent the anchorage means and linked to the friction means.

12. A brake comprising a pair of pivotally-connected floating shoes, in combination with a servo shoe operatively linked directly to both of the floating shoes.

13. A brake comprising a pair of pivoted shoes, in combination with a servo shoe operatively linked directly to both of the pivoted shoes.

14. A brake comprising, in combination, a shoe having a web, an operating arm, and a roller carried by said arm and engaging the edge of said web and having parts embracing said web between them.

15. A brake comprising, in combination, a fixedly-mounted channel-shaped member, shoes anchoring against the ends of said member, and a shoe nested within the channel of said member.

16. A brake comprising, in combination, a fixedly-mounted channel-shaped member, and a shoe nested within the channel of said member.

VINCENT BENDIX.
LUDGER E. LA BRIE.